Dec. 19, 1922.
H. C. RYDING ET AL.
LEAD SPINDLE.
FILED MAR. 31, 1921.
1,439,380
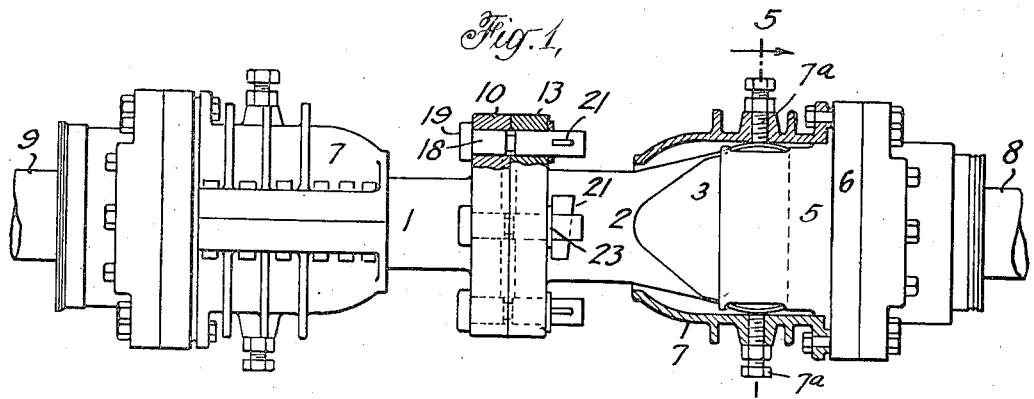
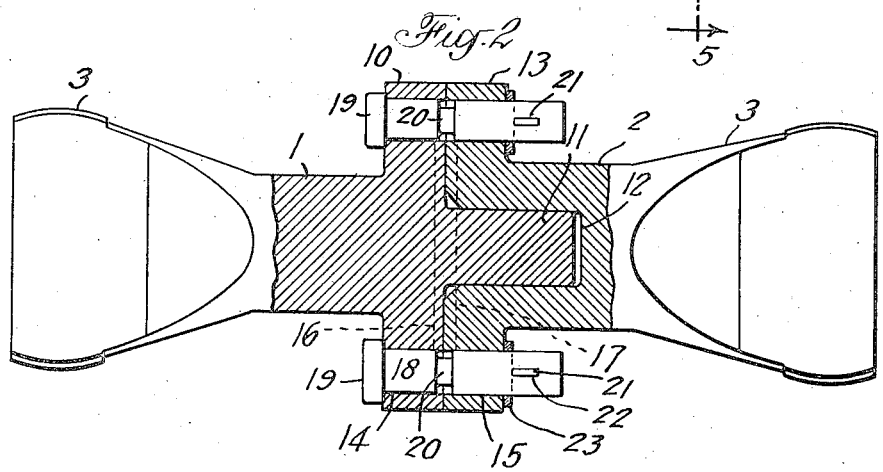
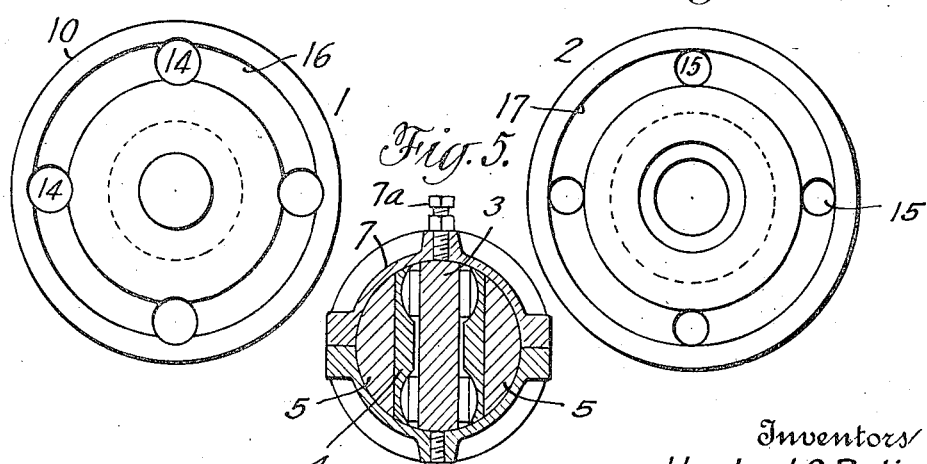
Inventors
Herbert C. Ryding
George A. Millar
By their Attorney Patented Dec. 19, 1922.

1,439,380

UNITED STATES PATENT OFFICE.

HERBERT C. RYDING AND GEORGE A. MILLAR, OF BIRMINGHAM, ALABAMA.

LEAD SPINDLE.

Application filed March 31, 1921. Serial No. 457,562.

*To all whom it may concern:*

Be it known that we, HERBERT C. RYDING, and GEORGE A. MILLAR, citizens of the United States, residing in Birmingham, Alabama, have invented certain new and useful Improvements in Lead Spindles, of which the following is a specification.

Our invention aims to provide an improved lead spindle designed particularly for use in connection with plate mills and adapted to be used in connection with the driving mechanism of such mills and of various other machines.

The accompanying drawings illustrate one embodiment of our invention.

Fig. 1 is an elevation of the same with parts in section and showing the driving and driven connections at the ends of the spindle;

Fig. 2 is a plan partly in section of the two parts of the spindle assembled;

Fig. 3 is a face elevation of one of the parts of the spindle, and Fig. 4 is a face elevation of the other;

Fig. 5 is a detail section on the line 5—5 of Fig. 1.

Referring to the drawings, the spindle is composed of two parts 1 and 2 provided at their outer ends with fish-tails 3 of the usual type with segmental circular edges. Each of the fish-tail ends is mounted in a block 4 adapted to rock in a plane at right angles to the rocking plane of the fish-tails so as to constitute a universal joint, the block 4 being carried between jaws 5 of the coupling block 6 and held in place by a split sleeve 7 which carries adjustable set screws 7ª which engage the crowned portion of the fish-tail. The sleeves 7 serve to hold the spindle central and to prevent the slapping motion of the fish-tail. The coupling illustrated is of a common type, and any other usual or suitable coupling may be substituted therefor. The coupling member at one end is fastened to the end of a motor shaft 8, and the opposite coupling member to the driven shaft 9 which operates the mill, usually through interposed gearing.

The coupling member 1 is provided with a flange 10 and with a central projecting pin 11, Fig. 2, which enters a socket 12 in the flange 13 of the member 2, the pin making a loose fit in the socket so as to allow ample space for lubrication and to avoid galling when the fastening bolts, hereinafter described, break.

The parts are held together by means of bolts passing through holes 14 and 15 in the respective flanges, and the faces of the flanges are formed with circular grooves 16 and 17 respectively in line with the holes, and of a depth illustrated in dotted lines in Fig. 2.

Each of the bolts has a shank 18, an integral head 19 and a reduced breaking portion 20. Each bolt is held against endwise movement by a key 21 passing through a slot 22 in the bolt and bearing against a washer 23 as shown in Figs. 1 and 2. The grooves 16 and 17 are of a combined depth about equal to the length of the breaking portion 20 of the bolts, or at least sufficient to permit a rotation of one part of the spindle with respect to the other when the bolts break and leave the broken end of a bolt projecting beyond the face of the opposite flange. The reduction in diameter of the part 20 of the bolt is such as to permit its withdrawal when it breaks notwithstanding any burr or other distortion on the broken end.

Under an excessive strain the bolts will break through the reduced parts 20. But the central pin and socket engagement will hold the parts of the spindle in substantial alignment. For this reason this spindle is safer than the old type. Also the broken bolts can be removed and new ones installed with the least delay. The cost of a breakage is merely that of the bolts, which is only a small fraction of the cost of the old unitary spindle, and a breakage for this reason so much the less expensive. Our improved spindle, therefore, has considerable advantage in safety and in the cost of material and time necessary for repairs when it breaks under any undue strain.

The bolts described fasten the parts of the spindle together longitudinally and also serve to transmit the rotary movement of one to the other. Various other fastening means may be used for fastening the parts together for rotary motion, and it is only the rotary connection that needs to be breakable.

Though we have described with great particularity of detail certain specific embodiments of our invention, yet it will be understood that the invention is not restricted to the particular embodiments disclosed. Various modifications thereof in detail and in the arrangement of the parts may be made by those skilled in the art without departure from the invention as defined in the following claims.

What we claim is:

1. A breaking lead spindle comprising parts having flanges with fastening bolts extending through said flanges, the flanges having grooves on their meeting faces adapted to accommodate the ends of the bolts when the latter break so as to permit rotation of the parts with relation to each other.

2. A breaking lead spindle comprising parts 1 and 2 with universal couplings on their ends, said parts having flanges 10 and 13 with registering bolt holes therethrough and having grooves 16 and 17 to accommodate the broken ends of such bolts.

3. A breaking lead spindle comprising parts 1 and 2 with universal couplings on their ends, said parts having flanges 10 and 13 with registering bolt holes therethrough and having grooves 16 and 17 to accommodate the broken ends of such bolts, the part 1 having a pin 11 entering a socket 12 in the other part to hold the two parts in alignment.

4. A breaking lead spindle comprising parts 1 and 2 with universal couplings on their ends, said parts having flanges 10 and 13 with registering bolt holes therethrough and having grooves 16 and 17 to accommodate the broken ends of such bolts, the part 1 having a pin 11 entering a socket 12 in the other part to hold the two parts in alignment in combination with bolts fastening said flanges together and having intermediate reduced portions 20 of a length corresponding with the distance between the bottoms of the grooves 16 and 17.

In witness whereof, we have hereunto signed our names.

HERBERT C. RYDING.
GEORGE A. MILLAR.